United States Patent [19]

Haddad et al.

[11] Patent Number: 4,927,527
[45] Date of Patent: * May 22, 1990

[54] METHOD FOR REDUCING OVERCRACKING DURING FCC CATALYST SEPARATION

[75] Inventors: James H. Haddad, Princeton Junction; Hartley Owen, Belle Mead, both of N.J.

[73] Assignee: Mobil Oil Corporation, New York, N.Y.

[*] Notice: The portion of the term of this patent subsequent to Aug. 12, 2003 has been disclaimed.

[21] Appl. No.: 293,543

[22] Filed: Jan. 3, 1989

Related U.S. Application Data

[63] Continuation of Ser. No. 70,663, Jul. 2, 1987, abandoned, which is a continuation of Ser. No. 837,863, Mar. 5, 1986, abandoned, which is a continuation of Ser. No. 632,086, Jul. 18, 1984, abandoned.

[51] Int. Cl.$^5$ .............................................. C10G 35/00
[52] U.S. Cl. .................... 208/161; 208/164; 422/144
[58] Field of Search ............... 208/113, 153, 161, 164; 422/144

[56] References Cited

U.S. PATENT DOCUMENTS

| | | | |
|---|---|---|---|
| 2,377,657 | 6/1945 | Watts | 208/161 |
| 2,417,867 | 3/1947 | Fulton et al. | 208/153 |
| 2,589,862 | 3/1952 | Putney | 208/161 |
| 2,606,097 | 8/1952 | Goodson et al. | 208/153 |
| 2,607,438 | 8/1952 | Bailey | 208/161 |
| 2,656,242 | 10/1953 | Matheson | 208/161 |
| 2,728,642 | 12/1955 | Cunningham et al. | 208/161 |
| 2,784,803 | 3/1957 | Saxton | 422/144 |
| 2,838,063 | 6/1958 | Weits et al. | 208/161 |
| 2,886,419 | 5/1959 | Orr et al. | 422/144 |
| 2,901,331 | 8/1959 | Held et al. | 208/161 |
| 2,934,494 | 4/1960 | Kleiber | 422/144 |
| 3,123,547 | 3/1964 | Palmer et al. | 208/78 |
| 3,261,776 | 7/1966 | Baumann et al. | 208/153 |
| 3,355,380 | 11/1967 | Luckenbach | 422/144 |
| 3,661,799 | 5/1972 | Cartmell | 208/153 |
| 3,677,715 | 7/1972 | Morrison et al. | 23/288 S |
| 3,785,962 | 1/1974 | Conner et al. | 208/153 |
| 4,043,899 | 8/1977 | Anderson et al. | 208/161 |
| 4,070,159 | 1/1978 | Myers et al. | 208/161 |
| 4,173,527 | 11/1979 | Heffley et al. | 208/161 |
| 4,219,407 | 8/1980 | Haddad et al. | 208/161 |
| 4,295,961 | 10/1981 | Fahrig et al. | 208/153 |
| 4,308,238 | 12/1981 | Greenwood | 422/144 |
| 4,388,218 | 6/1983 | Rowe | 208/164 |
| 4,404,095 | 9/1983 | Haddad et al. | 208/153 |
| 4,455,220 | 6/1984 | Parker et al. | 208/161 |
| 4,478,708 | 10/1984 | Farnsworth | 208/161 |
| 4,500,423 | 2/1985 | Krug et al. | 208/153 |
| 4,502,947 | 3/1985 | Haddad et al. | 208/161 |
| 4,541,921 | 9/1985 | Gross et al. | 208/153 |
| 4,552,725 | 11/1985 | Audeh | 422/144 |
| 4,572,780 | 2/1986 | Owen et al. | 422/144 |
| 4,605,491 | 8/1986 | Haddad et al. | 208/161 |
| 4,629,552 | 12/1986 | Haddad et al. | 422/144 |

*Primary Examiner*—Glenn Caldarola
*Attorney, Agent, or Firm*—A. J. McKillop; C. J. Speciale; R. D. Stone

[57] ABSTRACT

A method and apparatus for improving the stripping of hydrocarbons from catalyst particles in a fluidized catalytic cracking (FCC) unit. A stripper vessel is located directly adjacent the exhaust barrel of a separator and immediately begins stripping hydrocarbon from catalyst particles. The stripper is sealed at the catalyst exit by a catalyst seal pot, with the drain sized so as to permit only a portion of catalyst flow to pass therethrough, with the remainder catalyst overflowing the seal pot. The location of the stripper adjacent the separator exhaust and the provision of a catalyst seal pot, in other embodiments, can be combined either separately or together with a short contact time (SCT) stripper and-/or a catalyst particle deflector in order to reduce the "residence" time of hydrocarbons with catalyst particles.

7 Claims, 3 Drawing Sheets

METHOD FOR REDUCING OVERCRACKING DURING FCC CATALYST SEPARATION

This is a continuation of copending application Ser. No. 070,663, filed on July 2, 1987, abandoned, which is a continuation of application Ser. No. 06/837,863, abandoned; which is a continuation of application Ser. No. 06/632,086, abandoned.

BACKGROUND OF THE INVENTION

1. Field of the Invention

The present invention relates to methods and apparatus for the separation of a catalyst and hydrocarbon materials in a fluidized catalytic cracking (FCC) unit. More particularly, the present invention relates to an improved method and apparatus for reducing the contact time between catalyst and hydrocarbon materials after "separation" in a conventional separator.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered, requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds, and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, which could be a mechanical means, and/or stripping gas in a separate catalyst stripping zone. Hydrocarbon conversion products separated and materials stripped from the catalyst are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gas suspension phase exiting the riser and containing catalyst particles and vaporous hydrocarbon product materials, particularly the separation of high activity crystalline zeolite cracking catalysts, under more efficient separating conditions so as to reduce overcracking of hydrocarbon conversion products and promote the recovery of desired products of a hydrocarbon conversion operation. Cyclonic equipment is now typically used for efficient separation of fluidizable catalyst particles from the gas suspension phase. However, present day cyclonic equipment often permits an undesirable extended residence time of the product vapor within a large reactor vessel. This extended residence time reduces the desired product yield by as much as 4% through non-selective thermal cracking. Recent developments in this art have been concerned with the rapid separation and recovery of entrained catalyst particles from the gas suspension phase.

Various processes and mechanical means have been employed heretofore to effect rapid separation of the catalyst phase from the hydrocarbon phase at the termination of the riser cracking zone, to minimize contact time of the catalyst with cracked hydrocarbons. A representative one of these is shown in FIG. 1 and discussed below by way of general background for the present invention.

FIG. 1 in the present application corresponds to a simplified illustration of FIG. 2 from Anderson et al, U.S. Pat. No. 4,043,899, where similar reference numbers have been utilized to illustrate similar structures in the two figures. Anderson et al discloses a method for rapid separation of a product suspension, comprising the vaporous hydrocarbon product phase and fluidized catalyst particles (HYC+CAT, as seen entering riser conversion zone 24), by discharging the entire suspension directly from the riser conversion zone into a cyclone separation zone 4. The cyclone is modified to include a separate cyclonic stripping of the catalyst separated from the hydrocarbons vapors in an auxiliary stripper. The cyclone separator is modified to include an additional downwardly extending section comprising a lower cyclone stage 11. In this arrangement, catalyst separated from the gasiform material in the upper stage of the cyclone, slides along a downwardly sloping helical baffle 12 to the lower cyclone, where stripping steam (STM) is introduced to further separate entrained hydrocarbon products from the catalyst recovered from the upper cyclone. The steam and stripped hydrocarbons are passed from the lower cyclone through a concentric pipe 8, where they are combined with the hydrocarbon vapors separated in the upper cyclone. The separated, stripped catalyst is collected and passes from the cyclone separator 4 by conventional means through a dipleg 22 into a catalyst bed 60 in the bottom of reactor vessel 26 and out catalyst exit 44. This lower portion of vessel 26 also acts as a catalyst stripping section, comprising baffles 32, 34, and 36, with steam being supplied to the catalyst bed thereunder. Vaporous material separated in cyclone 4 can also be discharged into cyclone 52 and subsequently passed by way of conduit 54 into chamber 46 and withdrawn therefrom by conduit 48 for eventual fractionation.

While the Anderson et al patent, along with U.S. Pat. No. 4,219,407 to Haddad et al (herein incorporated by reference), represent improvements in the field of rapidly stripping hydrocarbon materials from catalyst particles, there is still a need to reduce total contact time between hydrocarbon materials and catalysts to reduce, to the extent possible, non-selective cracking. Thus, although a substantial amount of catalyst stripping occurs in catalyst bed 60, the stripped hydrocarbon material still contacts with additional catalyst particles as it is carried upward through the catalyst bed and into the entrance of cyclone 52 and from there to chamber 46 and eventual fractionation. This increased hydrocarbon material/catalyst contact contributes to uncontrolled and undesired cracking of the hydrocarbon materials.

It can be seen that at each stage, represented by baffles 32, 34 and 36, the hydrocarbon materials stripped from catalyst in the lower portion of vessel 26 undergoe further catalyst contact while making their way to the surface of the catalyst bed. Because the catalyst bed acts as a lower seal to the dipleg 22 (and thus prevents the flow of hydrocarbon-laden gas through dipleg 22 into the catalyst bed), often the dipleg must be extended deep within the catalyst bed in order to provide a sufficient seal. This depth requirement, plus the desirability of multistage stripping (in order to ensure that a high percentage of hydrocarbon material is removed from the catalyst particles) requires a rather substantial volume of catalyst in the catalyst bed 60, which volume serves to increase the uncontrolled residence time of hydrocarbon material with catalyst particles.

SUMMARY OF THE INVENTION

It is an object of the present invention to provide an improved method and apparatus for immediately stripping catalyst from a hydrocarbon vapor/catalyst particle suspension at the exit of a catalyst separator.

It is an additional object of the present invention to provide a method and apparatus whereby the contact time between catalyst and stripped hydrocarbon vapors is minimized.

It is a still further object of the present invention to provide a method and apparatus whereby the volume of catalyst utilized to seal a stripper vessel is minimized.

It is an additional object of the present invention to provide a method and apparatus for ensuring that a high percentage of catalyst particles leave a riser conversion zone when desired, that they are immediately stripped of entrained and coated hydrocarbon material upon leaving a mechanical separator, that the stripped hydrocarbon vapor and materials have minimal contact with catalyst after separation and that a reduced volume catalyst bed can be used to seal the output of a stripper, thus minimizing uncontrolled random thermal cracking of hydrocarbon vapors.

In its method aspects, the invention achieves the above and other objects by the steps of: separating a cracked hydrocarbon feed into a gaseous effluent and a separated catalyst; immediately and non-cyclonically stripping entrained and absorbed hydrocarbons from catalyst particles exiting a separator; and passing stripped hydrocarbons to a stripper exit. The method may further include the step of passing said stripped catalyst through a dipleg extension of a stripper and into a catalyst seal pot comprising at least one drain sized so as to permit between 10 and 90% of stripped catalyst flowing through the stripper to flow through a drain.

In its apparatus aspects, the invention achieves the above and other objects by an apparatus comprising a separator means for separating hydrocarbon gaseous effluent from a catalyst and cracked hydrocarbon mixture, the separator means having an entrance, an exit for gaseous hydrocarbon effluent and an exhaust barrel for the catalyst and cracked hydrocarbon mixture; a catalyst stripper means for supplying stripping gas for removing hydrocarbon materials entrained and absorbed by said catalyst; and means for mounting the stripper means adjacent the exhaust barrel of the separator means. The apparatus may also comprise a dipleg means connected to the catalyst stripper for extending a catalyst exit of the catalyst stripper; pot means, at least partially surrounding the dipleg means with catalyst, for at least temporarily containing catalyst flowing out of the dipleg means; and at least one drainage means in the pot means for permitting a portion of the catalyst in the pot means to flow therethrough, the dipleg means, the pot means, the exit means and the catalyst flow rate through the dipleg means cooperating to comprise a means for permitting flow through the drainage means in an amount equal to between 10 and 90% of the catalyst flow rate, with the remainder catalyst flow overflowing the pot means.

The invention, in both its method and apparatus aspects, can be configured as an original installation, or as a retrofit to an existing fluid catalytic cracking reactor system.

BRIEF DESCRIPTION OF THE DRAWINGS

A more complete appreciation of the invention, and many of the attendant advantages thereof, will be readily apparent as the same becomes better understood by reference to the accompanying drawings, wherein:

FIG. 2b is a side view of the subject matter in FIG. 2a;

DETAILED DESCRIPTION OF PREFERRED EMBODIMENTS

Figure 2A:
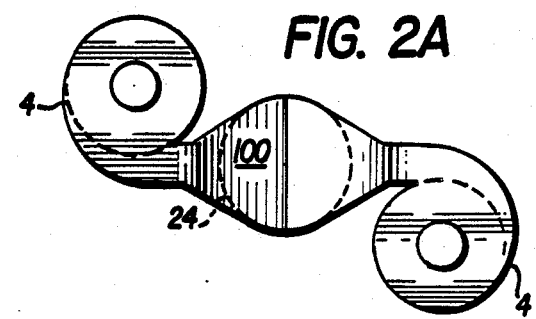
FIG. 2a is a top view of a riser conversion zone illustrating the connection to two cyclone separators.
Figure 2B:
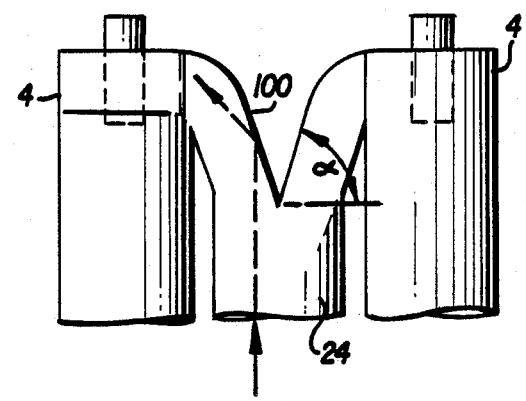
Figure 6:
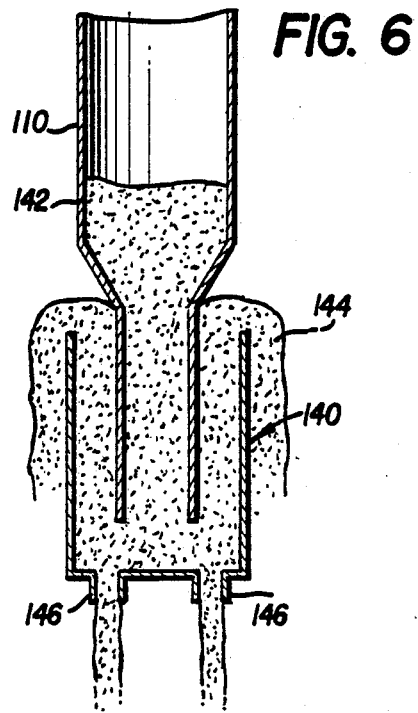
FIG. 6 is a side view partially in section of one embodiment of a catalyst seal pot in accordance with the present invention.
Figure 8:
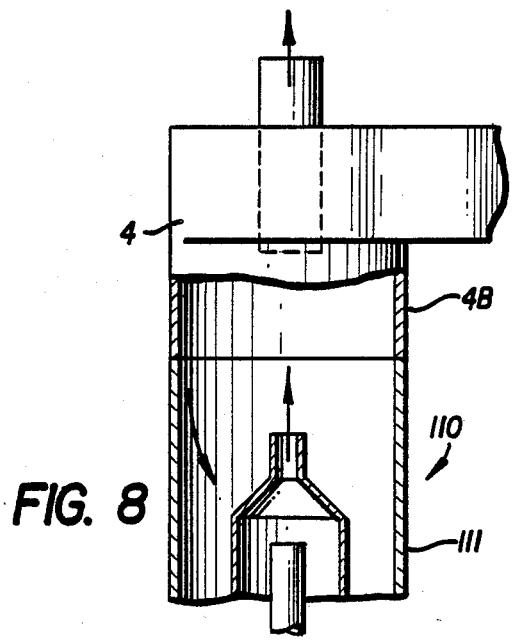
FIG. 8 is a side view partially in section of a short contact time catalyst stripper located adjacent the exhaust barrel of a cyclone separator in accordance with one embodiment of the present invention.
Figure 7:
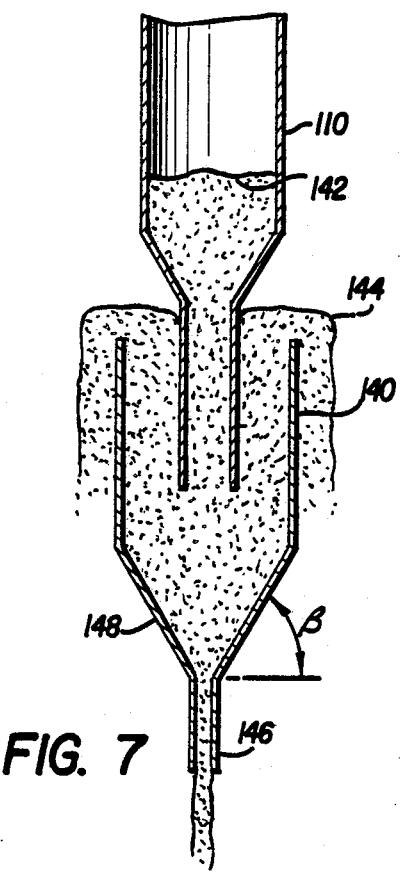
FIG. 7 is a side view partially in section of a further embodiment of a catalyst seal pot in accordance with the present invention.
Figure 9:
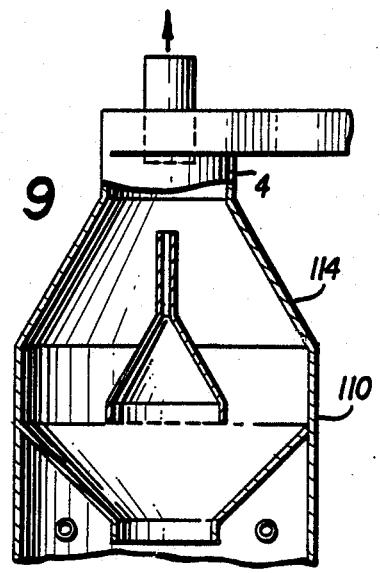
FIG. 9 is a side view partially in section of a modified cyclone separator exhaust barrel and its interconnection with a short contact time stripper in accordance with the present invention.
Figure 10:
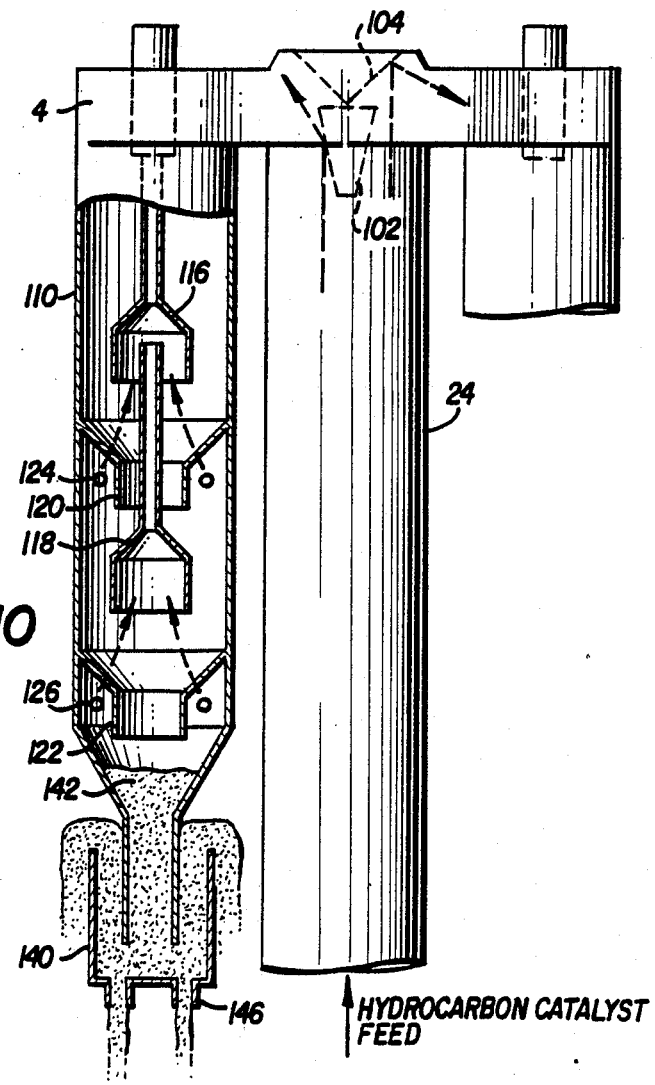
FIG. 10 is a side view partially in section illustrating one embodiment of the present invention in which baffles serve to deflect catalyst particles into the inlet of a cyclone separator which is immediately adjacent a two-stage short contact time stripper whose lower end is sealed by a catalyst seal pot, all in accordance with the present invention.

The present invention is directed towards a method and apparatus for reducing uncontrolled cracking by providing a stripper adjacent the exhaust barrel of a separator, as shown in FIGS. 8-10 in the present specification. Also discussed and claimed herein is a further method and apparatus for reducing uncontrolled cracking by utilizing a catalyst seal pot, which is illustrated in FIGS. 6, 7 and 10. The seal pot can be used in combination with the stripper of the invention. Additionally discussed is an improved short contact time (SCT) stripper as a method and apparatus for reducing uncontrolled cracking, and various embodiments are shown in FIGS. 3, 4 and 8-10, and discussed and claimed in a copending U.S. patent application Ser. No. 632,085, now U.S. 4,605,491 entitled "FCC Catalyst Stripping Method", executed and filed concurrently herewith. The stripper employed in the present invention can be a short contact type stripper. Also discussed in the present specification is a catalyst particle deflector as a method and apparatus also to reduce uncontrolled cracking, as illustrated in FIGS. 2a, 2b and 10, and discussed and application Ser. No. 632,084, now U.S. Pat. No. 4,629,552 entitled "FCC catalyst Separation Method" executed and filed concurrently herewith. The stripper employed in the invention can be used in an FCC installation which also includes a deflector. Because each of these methods and apparatus can be utilized separately or in various combinations, a discussion of each and their interaction follows, beginning with the location of a stripper adjacent the separator exhaust and continuing with the catalyst seal pot for sealing a stripper.

The general flow of a catalyst/hydrocarbon feed through a riser conversion zone 24 (also referred to as a riser) and into a separator 4 has been described above with reference to FIG. 1. Once catalyst particles leaving an FCC riser have been separated from hydrocarbon vapors in separator 4, it is desirable to strip any hydrocarbon vapor contained in voids between catalyst particles and within the pores of the catalyst particles themselves as completely as possible. To achieve these desires, and in accordance with one embodiment of the present invention, the catalyst stripper can be mounted in a continuation of the separator exit barrel or adjacent the separator exit.

Referring now more particularly to the drawings, wherein like numerals represent like elements throughout the several views, in FIG. 8, a short contact time (SCT) stripper 110 (described in detail below) is located adjacent the exit barrel 4B of cyclone separator 4. This construction is such that extensions of the exit barrel walls 4B make up the walls of the stripper vessel 111. However, the various baffles and steam injection mechanisms could be located in an extension of the exit barrel itself, if so desired. Separated catalyst particles exiting the separator 4 will immediately be processed by the catalyst stripper, reducing to an absolute minimum additional contact time of hydrocarbon vapor and materials with separated catalyst particles.

Figure 5:
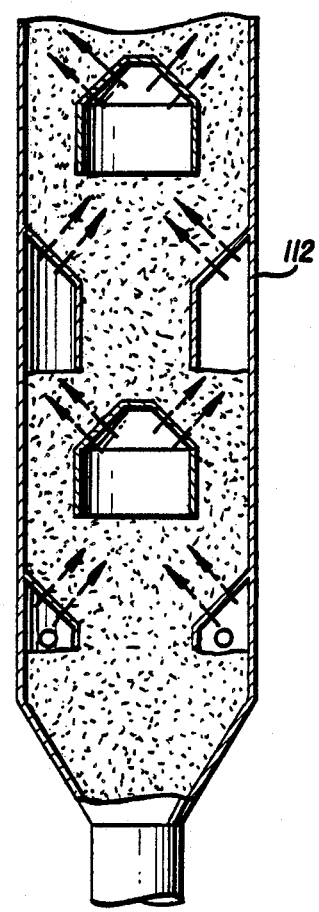
FIG. 5 is a side view partially in section of a four-stage countercurrent stripper which can be directly connected with the exhaust barrel of the cyclone separator illustrated in FIGS. 2a and 2b.

Although FIG. 8 illustrates an SCT stripper, conventional catalyst stripper could also be utilized in the separator exit barrel or immediately connected thereto, and a known four-stage countercurrent stripper 112 which may be used is illustrated in FIG. 5. Depending on the specifics of the stripper and the separator designs utilized, conical section 114, or some other mounting means joining the stripper to the separator exhaust, could be utilized, as illustrated in FIG. 9. FIG. 9 illustrates the combination of a conical diffuser connecting the exit barrel of cyclone separator 4 with the inlet of an SCT stripper 110.

In order to ensure that hydrocarbon vapors released in the stripper travel (whether an SCT stripper or the more conventional multi-stage stripper) travel either out of the cyclone separator gas exhaust (in the case of a multi-stage stripper) or through the appropriate stripper exhaust conduit (conduits 130, 132 and 134 in FIGS. 3 and 4 for the SCT stripper), it is necessary that the bottom of the strippers provide a sufficient resistance to gas flow in the downward direction. However, the lower portions cannot be completely sealed, as the catalyst particles gathering in the lower portion of the stripper must be removed for recycling and reuse in the reactor.

In the past, the extension of dipleg 22 into the catalyst bed 60 (FIG. 1) served to provide a sufficient pressure differential to force gas flow in the desired direction. However, the large volume of catalyst in the bed and the requirement that the catalyst stripper level extend to any separator dipleg (as in FIG. 1) provided additional catalyst through which injected stripping gas and separated hydrocarbons must pass, thus providing additional "residence" time and a further level of uncontrolled cracking for hydrocarbons in contact or entrained with the catalyst particles. Consequently, in a further embodiment of the present invention, the lower portion of the stripper unit extends into a catalyst seal pot 140, as shown in FIGS. 6 and 10. As shown in FIGS. 6 and 10, catalyst level 142 (which may be above, at or below steam injection points) in the stripper is maintained, such that the gas flow resistance from the catalyst level 142 through the seal pot and to the overflowing catalyst 144, is sufficient to prevent substantial hydrocarbon-laden steam flow therethrough. However, the volume of catalyst contained in the seal pot 140 is relatively small, such that any hydrocarbon-laden steam which is entrained therein does not have the long "residence" time expected of the normal catalyst bed/dipleg seals.

Figure 1:
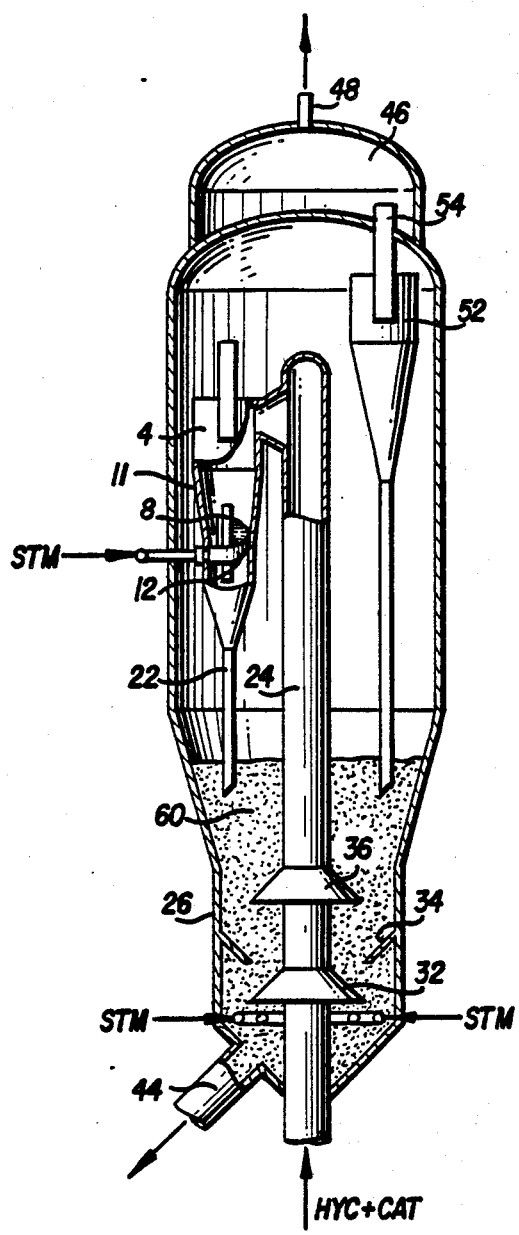
FIG. 1 is a diagrammatic sketch of the riser reactor, including catalyst stripping zone, illustrated in FIG. 2 of U.S. Pat. No. 4,043,899 to Anderson et al.

Catalyst seal pot 140 has one or more drains 146 sized so as to permit a flow of catalyst at least equal to between 10 and 90% and preferably to between 30 and 50% of the catalyst flow rate through the catalyst seal pot. The remainder of the catalyst not flowing through drains 146 overflows the catalyst seal pot at 144, whereupon the overflowing and draining catalysts are recovered and reused. Catalyst overflowing and draining from the seal pot is contained within the bottom of the reactor and passes through a reactor exit, in much the same manner as shown in FIG. 1 with reference to exit 44, whereupon the catalyst is reused. FIG. 6 illustrates a two drain seal pot, with FIG. 7 showing a single drain seal pot. In FIG. 7, the bottom of the seal pot has sloping sides 148, which serve to ensure that no catalyst remains trapped within the seal pot and that ultimately all catalyst will drain or overflow therefrom. Although the angle $\beta$ of the sloping sides 148 is not critical, the optimum angle would appear to be 60°.

The present invention can be used in conjunction with a unique riser deflector which assists in moving catalyst particles, along with hydrocarbon vapors, toward the exit of riser 24. In a conventional riser outlet arrangement, where the cyclone inlet is located below the top of the riser conversion zone 24, as shown in FIG. 1, catalyst particles impact against the closed top of the riser and rebound back towards the riser conversion zone. Thus, the velocity of the rebounding particles must be reduced by dynamic pressure of the rising hydrocarbon feed before again moving upwards and ultimately into the cyclone separator 4. This additional "residence" time (the time during which the catalyst is in immediate contact with hydrocarbon vapor and hydrocarbon material) causes overcracking and loss of precise control of the cracked products.

In order to prevent the problems caused by rebouding particles, a V-shaped or conical deflector 100 transforms the upward velocity vectors of catalyst particles contained in the hydrocarbon feed to a direction towards the inlet of cyclone separator 4. Applicants found that with the inclusion of a deflector shown in FIGS. 2a and 2b, the particle trajectories are as illustrated by the dotted line arrow in FIG. 2b, which reduces residence time due to the rebounding of catalyst particles.

In one embodiment of the deflector, the angle α of the deflector surface with respect to the horizontal (for a vertical riser) is between 60° and 70°, although different angles could be utilized, depending upon the location of the cyclone separator inlet with respect to the deflector, the diameter of the riser, the distance from the riser to the separator inlet, etc. Furthermore, existing risers may be converted to incorporate deflectors by the addition of baffle-type deflectors 102 and/or 104, as shown in FIG. 10. The surface of deflector 100 need not be planar and a smoothly contoured curve from the lowest point of the deflector to the upper surface of the cyclone separator inlet 4 would be advantageous, not only in the redirection of catalyst particle travel, but also to reduce any pressure drop which may be encountered between the upper portion of riser conversion zone 24 and the cyclone separator 4. Likewise, baffle-type deflectors 102 and/or 104 could also be curved to direct the catalyst/hydrocarbon vapor flow to separator 4. While a cyclone separator has been illustrated, this embodiment of the deflector would be equally useful with many types of separators known to those skilled in the fluid catalytic cracking art.

The present invention seeks to maintain hydrocarbon vapor and hydrocarbon materials stripped from catalyst separate and apart from contact with other catalyst particles in order to prevent additional uncontrolled thermal cracking. To do this, a catalyst stripper is provided at the exhaust barrel of a separator. In addition, as noted earlier, the stripper may be a short contact time (SCT) stripper. The structure and operation of a short contact time stripper will now be discussed.

Figure 3:
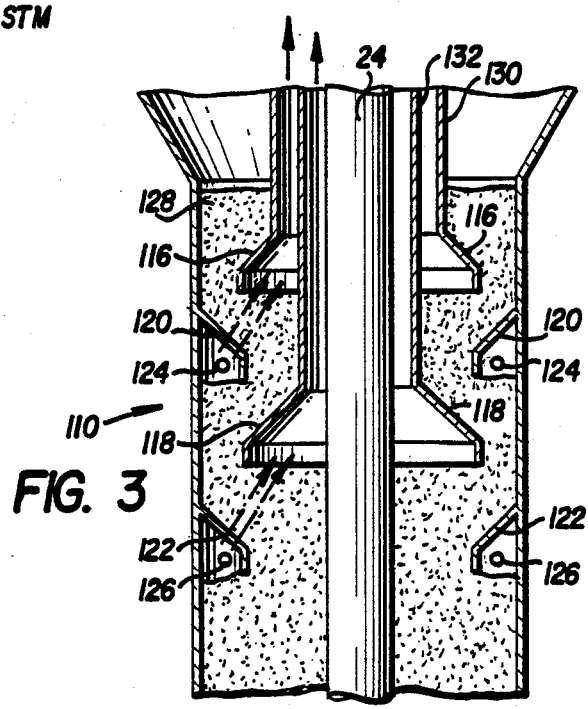
FIG. 3 is a side view partially in section of one embodiment of a short contact time catalyst stripper.

FIG. 3 illustrates one embodiment of a short contact time (SCT) stripper 110 which is adapted to be located concentrically around a riser conversion zone 24. A hydrocarbon/catalyst feed for the SCT stripper, of course, ascends vertically through the riser conversion zone 24, passes through a suitable separator and enters the upper portion of the SCT stripper 110 and descends towards a lower portion thereof. Baffles 116 and 118 serve to direct the descending separated catalyst particles towards perforated baffles 120 and 122. Steam is provided at outlets 124 and 126 and travels through only a portion of the flowing catalyst particles 128. The "portion" referred to is that catalyst located between the steam injection level and the intake of the inverted funnels. Since the steam does not flow through the catalyst particles above its associated funnel intake, it does not place the hydrocarbons entrained therewith in further contact with catalyst. Although all catalyst is contacted with steam, a given amount of steam does not contact all catalyst contained thereabove in the stripper vessel.

It can be seen in FIG. 3 that the hydrocarbon material stripped from the catalyst particles by the stripping stream is relatively quickly separated from further contact with catalyst particles, due to baffles 116 and 118 which serve as inverted funnels forcing the steam and carried hydrocarbon vapors into concentric pipes 130 and 132 for either further separation and/or stripping or fractionation (not shown). In the vertical arrangement shown in FIG. 3, the baffles 116 and 118 serve to move the catalyst in at least a partially horizontal direction, with perforated baffles 120 and 122 doing likewise. The descending catalyst particles 128 follow a circuitous route which permits a number of steam exposure locations or "stages."

Figure 4:
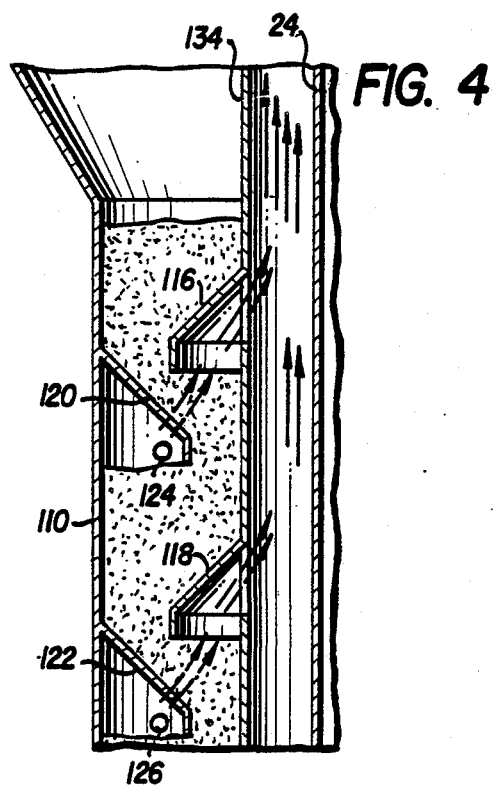
FIG. 4 is a side view partially in section of a further embodiment of a short contact time catalyst stripper.

Although the SCT stripper 110 shown in FIG. 3 is mounted concentrically around the hydrocarbon feed riser 24, the stripper could also be mounted separate and apart from the hydrocarbon feed riser, such as in the exhaust barrel of a separator, as shown in FIG. 10. Furthermore, although two stages of steam injection are shown in FIG. 3, more or less stages could be added, depending on the desired amount of stripping and the desired level of complexity. Additionally, there is no requirement that the stripped hydrocarbon vapors be carried in separate conduits 130 and 132, as shown in FIG. 3. For example, as shown in FIG. 4, a single conduit 134 could be utilized in conjunction with baffles 116 and 118 and perforated baffles 120 and 122, in the manner similar to that discussed with reference to FIG. 3. However, it should be noted that although FIG. 4 illustrates an SCT stripper which includes the riser conversion zone 24 concentrically mounted therein, the riser does not have to be concentrically mounted, and the FIG. 4 stripper, like that of FIG. 3, can also be mounted in the exhaust barrel of a separator. It is understood that conduits 130 and 132 in FIG. 3 and 134 in FIG. 4 would conduct the stripped hydrocarbon vapors away from further contact with catalyst particles in order to avoid increased "residence" time.

The present invention can be combined with a short contact time stripper and/or a catalyst deflector method steps and structures, which serve to reduce in a number of different manners the "residence" time during which hydrocarbon materials are in contact with catalyst particles. Various combinations of these steps and structures could be added to the method of and apparatus for locating a stripper in a separator exhaust barrel and/or sealing a stripper unit with a catalyst seal pot in an existing fluid catalytic cracking method or system, with corresponding improvements in operating efficiency. In a preferred embodiment, the present inventions as well as the SCT stripper and catalyst deflector could be utilized in a single fluid catalytic cracking process or apparatus, such as that illustrated in FIG. 10, which includes the catalyst particle deflectors 102 and 104, the catalyst stripper located in the barrel of cyclone separator 4, and the use of a two-stage short contact time stripper, sealed with a low volume catalyst seal pot.

Although the present invention has been described relative to a number of specific embodiments thereof, it is not so limited and many modifications and variations thereof will be readily apparent to those skilled in the art in light of the above teachings. It is, therefore, to be understood that within the scope of the appended claims the invention may be practiced otherwise than as specifically described.

The embodiments of the invention in which an exclusive property or privilege is claimed are defined as follows:

1. In a method of fluid catalytic cracking of a hydrocarbon feed wherein said feed contacts a source of hot regenerated catalyst in the base of a riser reactor, said feed is cracked in said riser reactor to lighter cracked products and said catalyst is deactivated in said riser, and a mixture of cracked products and deactivated catalyst containing entrained and absorbed hydrocarbons is discharged from said riser reactor, separated into a gaseous effluent and a separated catalyst stream, said separated catalyst is stripped with a stripping fluid in a catalyst stripper and regenerated in a catalyst regenerator to produce regenerated catalyst, and said regenerated catalyst is recycled to the base of said riser reactor to crack said hydrocarbon feed, the improvement comprising;

separating in a separator connective with said riser reactor a cracked hydrocarbon feed into a gaseous effluent and a separated catalyst;

immediately stripping upon leaving said catalyst separator within a stripper vessel connective with said riser reactor, entrained and absorbed hydrocarbons from catalyst particles in said separated catalyst as said catalyst particles exit said separator;

passing said stripper hydrocarbons to a stripped hydrocarbon exit; and discharging said stripped catalyst from said stripper vessel through a dipleg extension of said stripper vessel into a catalyst seal pot, said seal pot thereby sealing said dipleg extension, passing between 10 and 90% of said stripped catalyst flowing through said stripper through at least one drain of said seal pot and overflowing a remainder of said stripped catalyst from said seal pot, said seal pot being suspended in an atmosphere of said reactor vessel above a catalyst bed in said reactor vessel.

2. The method of claim 1, wherein said discharged stripped catalyst flows through said seal pot in the absence of passing aerating gas into said seal pot.

3. The method of claim 2, wherein said discharged stripped catalyst axially passes into said seal pot.

4. The method of claim 3, further comprising the step of passing said stripped hydrocarbons axially through an exhaust barrel of said separator.

5. The method of claim 4, wherein a top portion of said stripper vessel is attached to, and in open communication with, a bottom portion of said separator exhaust barrel.

6. The method of claim 1, wherein the catalyst is immediately and noncyclonically stripped upon leaving said catalyst separator.

7. A method of fluid catalytic cracking of a hydrocarbon feed comprising the steps of:

passing a mixture, as a suspension, of said hydrocarbon feed and a catalyst through a riser conversion zone contained within a reactor vessel and cracking said hydrocarbon feed in the riser conversion zone;

passing said mixture through a deflection zone in which said catalyst is physically deflected toward an exit of said deflection zone;

passing said deflected mixture from said deflection zone exit towards a separator connective with said riser conversion zone, wherein said mixture passes from said riser conversion zone to said deflection zone and to said separator without passing into an atmosphere of said reactor vessel;

separating at least a portion of said catalyst from said mixture in said separator with the remainder forming a gaseous effluent;

discharging said gaseous effluent from said reactor vessel;

providing a stripper vessel connective with said separator having an entrance, a catalyst exit and a stripped hydrocarbon exit at an exhaust barrel of said separator;

passing said separated catalyst from said separator to said stripper vessel entrance, said stripper vessel having a catalyst stripping zone therein;

injecting a stripping gas into said stripper vessel at an injection location for exposure to only a portion of said separated catalyst located above said injection location and passing said stripper gas and hydrocarbons stripped from said separated catalyst, into an upstream end of a conduit, said upstream end being located within said stripping zone, directly to said stripped hydrocarbon exit;

passing stripped catalyst through a dipleg extension and into a catalyst seal pot, thereby sealing said dipleg extension;

passing between 10 and 90% of said stripped catalyst flowing through said stripper through a drain of said seal pot, overflowing the remainder of said stripped catalyst from said seal pot, said seal pot being located in a reactor vessel atmosphere above a catalyst bed in said reactor vessel; and discharging said catalyst passing through said drain and overflowing said seal pot, from said reactor vessel.

* * * * *